United States Patent Office 3,657,436
Patented Apr. 18, 1972

3,657,436
METHOD OF TREATING COL-SK VIRUS INFECTIONS
Leo Berger, Montclair, Emanuel Grunberg, North Caldwell, Arthur Stempel, Teaneck, and Leo Henryk Sternbach, Upper Montclair, N.J., assignors to Hoffmann-La Roche Inc., Nutley, N.J.
No Drawing. Continuation-in-part of application Ser. No. 755,771, Aug. 28, 1968, which is a continuation-in-part of application Ser. No. 559,771, June 21, 1966. This application Feb. 9, 1970, Ser. No. 10,037
Int. Cl. A61k 27/00
U.S. Cl. 424—244
8 Claims

ABSTRACT OF THE DISCLOSURE

Anthranilic acid derivatives which are useful in combatting viral infections caused by Col-SK and compositions containing these derivatives.

CROSS REFERENCE TO RELATED APPLICATIONS

This application is a continuation-in-part of application Ser. No. 755,771, filed Aug. 28, 1968, now abandoned which is in turn a continuation in part of application Ser. No. 559,771, filed June 21, 1966, now abandoned.

SUMMARY OF THE INVENTION

In accordance with this invention, it has been found that viral infections caused by Col-SK can be combatted by internally administering an effective amount of an anthranilic acid derivative of the formula:

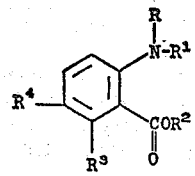

(I)

wherein R, when taken alone, is hydrogen; $R^1$, when taken alone, is hydrogen or lower alkanoyl; $R^2$, when taken alone is hydrogen; R, $R^1$ and $R^2$, when taken together, are ethylidyne; and $R^3$ and $R^4$ each when taken alone, is a member selected from the group consisting of hydrogen, halogen, and lower alkoxy, with at least one of said $R^3$ and $R^4$ being hydrogen. Preferred anthranilic acid derivatives are those wherein $R^1$ is lower alkanoyl, $R^3$ is hydrogen, and $R^4$ is chlorine. Especially preferred is N-acetyl-5-chloroanthranilic acid.

DETAILED DESCRIPTION

By the term "lower alkanoyl" as employed herein, is meant a radical of the formula:

wherein $R^6$ is lower alkyl. By the term "lower alkoxy" is meant an alkoxy group containing a lower alkyl group. By the term "lower alkyl" is meant a straight or branched chain alkyl radical of up to about 6 carbons, such as methyl, ethyl, propyl, isopropyl, butyl, sec.-butyl, tert.-butyl, and the like. Preferred lower alkyl radicals are those having up to about 3 carbon atoms, with methyl being especially preferred. By the term "halogen" is meant a member selected from the group consisting of chlorine, fluorine, bromine and iodine.

The compounds of Formula I are all known compounds and are readily prepared by the reaction of anthranilic acid or an appropriately substituted anthranilic acid with an acid anhydride. The product of this reaction is normally an N-acyl-anthranilic acid. However, when acetic anhydride is employed as the acylating agent, there is first produced a 2-methyl-4H-3,1-benzoxazin-4-one, which on hydrolysis is converted to the corresponding N-acetyl-anthranilic acid.

As stated above, the anthranilic acid derivatives of Formula I are useful as antiviral agents, being particularly active against the encephalo myocarditis virus (Col-SK) in warm blooded animals. These compounds may be administered internally, either enterally or parenterally, in the form of pharmaceutical preparations containing the anthranilic acid derivative in admixture with a pharmaceutically acceptable organic or inorganic carrier material, such as water, gelatin, lactose, starch, magnesium stearate, talc, vegetable oils, gums, polyethylene glycol, petroleum jelly, and the like. These pharmaceutical preparations may be in solid form, such as tablets, capsules, lozenges, dragées, or the like; or in liquid form, such as emulsions, syrups, solutions, and so forth. The amount of anthranilic acid derivative in these formulations is not narrowly critical and can vary from 1–99 percent as may be desired. When employed in an oral dosage form, it is preferred that the anthranilic acid compound of this invention comprises from about 1 to about 30 weight percent of the composition, with amounts of about 5 to about 20 weight percent being preferred.

Thus, the compounds of Formula I above are safe and non-toxic as shown by tests in warm blooded animals. Thus, the compounds of Formula I above are useful as antiviral agents in mammals.

In Table 1 below, there are set forth the data from tests evaluating the activity of representative compounds within the scope of Formula I against Col-SK, virus. These tests were effected by the following technique: A group of Swiss albino mice weighing 9 to 12 grams each was treated intraperitoneally with the compound being tested. Twenty-four hours after this treatment, the treated mice and an untreated control group having an equal number of mice were treated intraperitoneally with a brain pool of Col-SK virus, derived from monkey kidney cultures. The treated group of mice was given a second treatment with the test compound immediately after infection and again 24 hours after infection. The treated and untreated mice were then observed daily for symptoms and the number of survivors recorded after 21 days. The results of these tests are reported in Table 1 as $CD_{50}$ values, as determined by the method of Reed and Muench [Am. Jour. Hygiene 27, 493 (1961)], or in the case of less active compounds, as the percent survival rate—the difference between the percent survivors of the treated group less the percent survivors of the untreated control group—at a specified dosage in milligrams per kilogram of body weight.

In addition, Table 1 also contains data from tests for the evaluation of two compounds outside the scope of Formula I for purposes of comparison.

TABLE 1

Test results

| Compound: | Col-SK |
|---|---|
| 2-methyl-4H,3,1-benzoxazin-4-one | 27% at 100 |
| 2-methyl - 6 - chloro-4H-3,1-benzoxazin-4-one | 177 |
| 2-methyl - 5 - chloro-4H-3,1-benzoxazin-4-one | 27% at 500 |
| 5-chloroanthranilic acid | 10% at 200 |
| N-acetyl-5-chloroanthranilic acid | 116 |
| N-acetylanthranilic acid | 130 |
| N-acetyl-6-chloroanthranilic acid | 191 |
| N-acetyl-3-chloroanthranilic acid | Inactive |
| N-acetyl-5-bromoanthranilic acid | 20% at 400 |

TABLE 1.—Continued

| Compound: | Col-SK |
|---|---|
| N-acetyl-5-methoxyanthranilic acid | 193 |
| Methyl-N-acetyl-5-chloroanthranilate | Inactive |
| N-acetyl-3,5-dibromoanthranilic acid | Inactive |

Illustrative examples of pharmaceutical formulations containing 2-methyl-6-chloro-4H-3,1-benzoxazin-4-one are as follows:

(a) Tablet 10 parts by weight of 2-methyl-6-chloro-4H-3,1-benzoxazin-4-one are mixed with 129 parts by weight of lactose, 50 parts by weight of cornstarch, 8 parts by weight of pregelatinized cornstarch, and 3 parts by weight of calcium stearate. After blending, the mixture is slugged on a tablet compressing machine, the slugs are comminuted to No 16 mesh and the comminuted particles are mixed. The tablets are then compressed at a tablet weight of 200 milligrams using tablet punches having a diameter of 5/16".

(b) Capsule 25.5 parts by weight of 2-methyl-6-chloro-4H-3,1-benzoxazin-4-one are mixed with 159.5 parts by weight of lactose and 30 parts by weight of cornstarch. The resulting mixture is blended by passing through a Fitzpatrick comminuting machine with a No. 1A screen with knives forward. The blend is then mixed with 5 parts by weight of talc and blended. The resulting mixture is charged into No. 4 hard shell gelatin capsules, each capsule containing 220 milligrams of the composition.

(c) Suppository 1.23 parts by weight of Wecobee M (a refined pharmaceutical grade of synthetic cocoa butter—coconut derived—marketed by E. F. Drew Company, New York, N.Y) and 0.045 part by weight of Carnauba wax are melted, mixed, and cooled to 45° C. 2-methyl-6-chloro-4H-3,1-benzoxazin-4-one is stirred in as a fine powder until uniformly and completely dispersed. The resulting mixture is poured into suppository molds to yield suppositories having an individual weight of 1.3 grams. The suppositories are cooled and removed from the molds.

(d) Parenteral (10,000 cc. volume)—To a solution of 51 grams of 2-methyl-6-chloro-4H-3,1-benzoxazin-4-one in 150 cc. of benzyl alcohol is added 4,000 cc. of propylene glycol and 1,000 cc. of ethanol. Then there is added 12 grams of benzoic acid, a solution of 488 grams of sodium benzoate in 3,000 cc. of water, followed by additional water to a total combined volume of 10,000 cc. The resulting solution is filtered, charged to ampules, gassed with nitrogen, sealed, and autoclaved at 10 p.s.i. for 30 minutes.

Similar pharmaceutical formulations containing the other antiviral anthranilic acid derivatives disclosed above are prepared by substituting such other compound for 2-methyl-6-chloro-4H-3,1-benzoxazin-4-one. In the case of parenteral formulations, however, the above-given formulation applies only to the benzoxazinones. The anthranilic acid compounds are preferably supplied in the form of duplex ampules, one containing the dry drug and the other diluent, suitable for intramuscular injection. For example, 25 milligrams of parenteral grade, fiber-free N-acetyl-6-chloro-anthranilic acid is charged to a 5-milliliter ampule and the ampule is sealed and sterilized by heating at 225° F. for 2 hours. A 2-milliliter ampule is charged under a nitrogen atmosphere with an aqueous solution of triethanolamine containing 7.5 milligrams of triethanolamine per milliliter. The ampule is then sealed and sterilized by heating at 212° F. for 30 minutes. Immediately prior to use, the powder is solubilized with the aqueous triethanolamine.

What is claimed is:

1. A method for treating viral infections caused by Col-SK comprising internally administering to a mammal infected with such virus an effective amount of a compound defined by the formula:

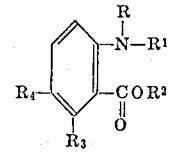

wherein

R, when taken alone, is hydrogen;
$R^1$, when taken alone is hydrogen or lower alkanoyl;
$R^2$, when taken alone, is hydrogen;
R, $R^1$, and $R^2$, when taken together, are ethylidyne; and
$R^3$ and $R^4$, each when taken alone, is a member selected from the group consisting of hydrogen, halogen, and lower alkoxy, with at least one of said $R^3$ and $R^4$ being hydrogen.

2. The method of claim 1 wherein said compound is 2-methyl-6-chloro-4H-3,1-benzoxazin-4-one.

3. The method of claim 1 wherein said compound is N-acetyl-5-chloroanthranilic acid.

4. The method of claim 1 wherein said compound is N-acetyl anthranilic acid.

5. The method of claim 1 wherein said compound is N-acetyl-5-methoxy anthranilic acid.

6. An oral dosage composition in the form of a tablet or capsule comprising from about 1% to 99% by weight of a solid pharmaceutically acceptable carrier and from 1% by weight to 99% by weight of 2-methyl-6-chloro-4H-3,1-benzoxazin-4-one.

7. A solid composition in the form of a suppository comprising from 1% by weight to 99% by weight of a solid pharmaceutically acceptable carrier and from 1% by weight to 99% by weight of 2-methyl-6-chloro-4H-3,1-benzoxazin-4-one.

8. A sterile liquid composition suitable for intramuscular injection comprising from 1% by weight to 99% by weight of a liquid pharamaceutically acceptable inert carrier and from 1% by weight to 99% by weight of 2-methyl-6-chloro-4H-3,1-benzoxazin-4-one.

References Cited

UNITED STATES PATENTS 3,136,815    6/1964    Reeder _____ 260—562 B

OTHER REFERENCES

Antibiotic News, vol. 5, No. 9, October 1968, pp. 1 and 3.

Chemical Abstracts, Fifth Decennial Index, vol. 41–50, 1960, Subject Index A–Az, pp. 1083(s)–1085(s).

Rhodes et al., Texbook of Virology, The Williams and Wilkins Co., Baltimore, 1962, pp. 495–497.

JEROME D. GOLDBERG, Primary Examiner